(12) United States Patent
Lee (10) Patent No.: US 11,187,087 B2
(45) Date of Patent: Nov. 30, 2021

(54) TURBINE BLADE, AND TURBINE AND GAS TURBINE INCLUDING THE SAME

(71) Applicant: DOOSAN HEAVY INDUSTRIES & CONSTRUCTION CO., LTD., Changwon-si (KR)

(72) Inventor: Hyuk Hee Lee, Gimhae-si (KR)

( * ) Notice: Subject to any disclaimer, the term of this patent is extended or adjusted under 35 U.S.C. 154(b) by 230 days.

(21) Appl. No.: 16/735,459

(22) Filed: Jan. 6, 2020

(65) Prior Publication Data

US 2020/0271001 A1 Aug. 27, 2020

(30) Foreign Application Priority Data

Feb. 21, 2019 (KR) .......................... 10-2019-0020312

(51) Int. Cl.
F01D 5/18 (2006.01)

(52) U.S. Cl.
CPC .......... F01D 5/187 (2013.01); *F05D 2240/81* (2013.01); *F05D 2260/202* (2013.01)

(58) Field of Classification Search
CPC ...................................................... F01D 5/187
See application file for complete search history.

(56) References Cited

U.S. PATENT DOCUMENTS

| | | | | |
|---|---|---|---|---|
| 5,993,155 A * | 11/1999 | Endres | ...................... | F01D 5/18 416/96 R |
| 6,017,189 A * | 1/2000 | Judet | ...................... | F01D 5/081 416/97 R |
| 7,147,439 B2 * | 12/2006 | Jacala | ...................... | F01D 5/08 416/97 R |
| 7,766,606 B2 | 8/2010 | Liang | | |
| 8,523,527 B2 * | 9/2013 | Lacy | ...................... | F01D 5/187 416/97 R |
| 8,734,108 B1 | 5/2014 | Liang | | |
| 10,100,647 B2 * | 10/2018 | Molter | .................... | F01D 5/187 |
| 2012/0027576 A1 * | 2/2012 | Tibbott | .................... | F01D 11/10 415/175 |
| 2012/0082550 A1 * | 4/2012 | Harris, Jr | ................ | F01D 5/081 416/95 |
| 2015/0152736 A1 * | 6/2015 | Liang | ...................... | F01D 5/186 415/115 |

(Continued)

FOREIGN PATENT DOCUMENTS

| | | |
|---|---|---|
| JP | 2006-188962 A | 7/2006 |
| JP | 2011-185271 A | 9/2011 |
| KR | 1020070088369 A | 8/2007 |

*Primary Examiner* — Woody A Lee, Jr.
(74) *Attorney, Agent, or Firm* — Harvest IP Law, LLP (57) ABSTRACT

A turbine blade, a turbine, and a gas turbine which have enhanced cooling performance are provided. The turbine blade may include: an airfoil having a blade shape and including a suction side formed in a convex shape and a pressure side formed in a concave shape; a platform coupled to a lower portion of the airfoil; and a root member protruding downward from the platform and coupled to a rotor disk, wherein the platform may include: a plurality of inlets through which air is drawn into the platform; a plurality of outlets through which the air is discharged from the platform; and a cooling passage connecting the inlets to the outlets and including a plurality of dispersion spaces, a width in each dispersion spaces increasing from the inlet to the outlet, and a narrow space formed between the dispersion spaces and having a width less than the width of each dispersion spaces.

20 Claims, 7 Drawing Sheets

(56) References Cited

U.S. PATENT DOCUMENTS

| | | | |
|---|---|---|---|
| 2015/0345302 A1* | 12/2015 | Birnkrant | C04B 35/10 |
| | | | 416/97 A |
| 2016/0305254 A1* | 10/2016 | Snyder | F01D 11/006 |
| 2017/0016338 A1* | 1/2017 | Porter | F01D 9/041 |
| 2017/0016348 A1* | 1/2017 | Golden | F01D 9/065 |
| 2017/0175544 A1* | 6/2017 | Smith | F01D 5/187 |
| 2020/0072059 A1* | 3/2020 | Webster | F01D 5/186 |

\* cited by examiner

TURBINE BLADE, AND TURBINE AND GAS TURBINE INCLUDING THE SAME

CROSS-REFERENCE TO RELATED APPLICATION

This application claims priority to Korean Patent Application No. 10-2019-0020312, filed on Feb. 21, 2019, the disclosure of which is incorporated herein by reference in its entirety.

BACKGROUND

Field

Apparatuses and methods consistent with exemplary embodiments relate to a turbine blade having enhanced cooling performance, and a turbine and a gas turbine including the turbine blade.

Description of the Related Art

A gas turbine is a power engine configured to mix fuel with air compressed by a compressor, combust the mixture of the fuel and the compressed air, and rotate a turbine using a high-temperature gas generated by the combustion. Gas turbines are used to drive a generator, an aircraft, a vessel, a train, and so forth.

The gas turbine includes a compressor, a combustor, and a turbine. The compressor draws external air thereinto, compresses the air, and transmits it to the combustor. The combustor mixes fuel with compressed air supplied from the compressor, and combusts the mixture of the fuel and the compressed air to generate a high temperature and high-pressure combustion gas. Combustion gas generated by the combustion is discharged to the turbine. Turbine blades provided in the turbine are rotated by the combustion gas, whereby power is generated. Generated power may be used in various fields, e.g., for generating electricity, driving a mechanical device, etc.

Recently, to increase the efficiency of a turbine, the temperature (turbine inlet temperature: TIT) of gas that is drawn into the turbine is on a gradual upward trend. Hence, the importance of heat-resist treatment and cooling of turbine blades is being emphasized.

A method of cooling a turbine blade includes a film cooling scheme and an internal cooling scheme. The film cooling scheme is a scheme in which a coating film is formed on an outer surface of the turbine blade so that heat may be prevented from being transferred from the outside to the blade. In the film cooling scheme, heat-resistant characteristics and mechanical durability of the turbine blade depend on heat-resistant paint to be applied to the turbine blade.

The internal cooling scheme is a scheme of cooling the blade by heat exchange between cooling fluid and the blade. Generally, the turbine blade is cooled by compressed cooling air supplied from the compressor of the gas turbine. Because air compressed by the compressor is generated to be used in the combustor of the gas turbine, the entire efficiency of the gas turbine may be reduced if the amount of compressed air is increased to cool the turbine blade. Therefore, to efficiently cooling the turbine blade, the entirety of the turbine blade is required to be uniformly cooled by a small amount of cooling fluid.

A platform formed in a lower portion of the turbine blade passes through a high-temperature gas passage section of the gas turbine and forms an internal flow passage boundary. Depending on design conditions, i.e., a gas passage temperature and a mechanical load, it may be significantly difficult to secure the lifetime of the platform to a degree required in an engine. Therefore, it is important to efficiently cool the platform.

SUMMARY

Aspects of one or more exemplary embodiments provide a turbine blade, a turbine, and a gas turbine having enhanced cooling performance.

Additional aspects will be set forth in part in the description which follows and, in part, will become apparent from the description, or may be learned by practice of the exemplary embodiments.

According to an aspect of an exemplary embodiment, there is provided a turbine blade including: an airfoil having a blade shape and including a suction side formed in a convex shape and a pressure side formed in a concave shape; a platform coupled to a lower portion of the airfoil; and a root member protruding downward from the platform and coupled to a rotor disk. The platform may include: a plurality of inlets through which air is drawn into the platform; a plurality of outlets through which the air is discharged from the platform; and a cooling passage connecting the inlets to the outlets and including a plurality of dispersion spaces, a width in each dispersion spaces increasing from the inlet to the outlet, and a narrow space formed between the dispersion spaces and having a width less than the width of each dispersion spaces.

The cooling passage may include a flat surface extending in a direction oriented from the inlet toward the outlet, an inclined guide surface formed to face the flat surface and extending to be inclined with respect to the flat surface, and a shock surface coupled with the inclined guide surface and extending in a direction oriented from the inclined guide surface toward the flat surface.

The inclined guide surface and the shock surface may be alternately formed.

The dispersion space may be formed by the inclined guide surface and the shock surface, and the narrow space may be formed between the shock surface and the flat surface.

The inclined guide surface may protrude in a direction toward the airfoil.

The inclined guide surface may protrude in a direction toward a side end of the platform.

An angle formed between the shock surface and the flat surface may be greater than an angle formed between the inclined guide surface and the flat surface.

The cooling passage may include a first cooling passage formed to face the suction side of the airfoil, and a second cooling passage formed to face the pressure side of the airfoil. Each of the first cooling passage and the second cooling passage may include a flat surface extending in a direction oriented from the inlet toward the outlet, an inclined guide surface formed to face the flat surface and inclined with respect to the flat surface, and a shock surface extending in a direction oriented from the inclined guide surface toward the flat surface.

In the first cooling passage, a height of the inclined guide surface that is formed in a central portion may be less than a height of the inclined guide surface that is formed at an outer side.

In the second cooling passage, a height of the inclined guide surface that is formed in a central portion may be greater than a height of the inclined guide surface that is formed at an outer side.

A plurality of shock protrusions may be formed on the inclined guide surface, and each of the shock protrusions may include a fine inclined surface formed to be inclined with respect to the flat surface, and a fine collision surface formed in parallel to the shock surface.

According an aspect of another exemplary embodiment, there is provided a turbine including: a rotor disk configured to be rotatable; and a plurality of turbine blades installed on the rotor disk. Each of the turbine blade may include: an airfoil having a blade shape and including a suction side formed in a convex shape and a pressure side formed in a concave shape; a platform coupled to a lower portion of the airfoil; and a root member protruding downward from the platform and coupled to a rotor disk. The platform may include: a plurality of inlets through which air is drawn into the platform; a plurality of outlets through which the air is discharged from the platform; and a cooling passage connecting the inlets to the outlets and including a plurality of dispersion spaces, a width in each dispersion spaces increasing from the inlet to the outlet, and a narrow space formed between the dispersion spaces and having a width less than a width of each dispersion spaces.

The cooling passage may include a flat surface extending in a direction oriented from the inlet toward the outlet, an inclined guide surface formed to face the flat surface and extending to be inclined with respect to the flat surface, and a shock surface coupled with the inclined guide surface and extending in a direction oriented from the inclined guide surface toward the flat surface.

The inclined guide surface and the shock surface may be alternately formed.

The dispersion space may be formed by the inclined guide surface and the shock surface, and the narrow space may be formed between the shock surface and the flat surface.

The inclined guide surface may protrude in a direction toward the airfoil.

The inclined guide surface may protrude in a direction toward a side end of the platform.

An angle formed between the shock surface and the flat surface may be greater than an angle formed between the inclined guide surface and the flat surface.

The cooling passage may include a first cooling passage formed to face the suction side of the airfoil, and a second cooling passage formed to face the pressure side of the airfoil. Each of the first cooling passage and the second cooling passage may include a flat surface extending in a direction oriented from the inlet toward the outlet, an inclined guide surface formed to face the flat surface and inclined with respect to the flat surface, and a shock surface extending in a direction oriented from the inclined guide surface toward the flat surface.

According an aspect of another exemplary embodiment, there is provided a gas turbine including: a compressor configured to compress air drawn thereinto from an outside; a combustor configured to mix fuel with air compressed by the compressor and combust a mixture of the fuel and the compressed air; and a turbine including a plurality of turbine blades configured to be rotated by combustion gas discharged from the combustor. Each of the turbine blades may include a rotor disk configured to be rotatable; and a plurality of turbine blades installed on the rotor disk. Each of the turbine blade may include: an airfoil having a blade shape and including a suction side formed in a convex shape and a pressure side formed in a concave shape; a platform coupled to a lower portion of the airfoil; and a root member protruding downward from the platform and coupled to a rotor disk. The platform may include: a plurality of inlets through which air is drawn into the platform; a plurality of outlets through which the air is discharged from the platform; and a cooling passage connecting the inlets to the outlets and including a plurality of dispersion spaces, a width in each dispersion spaces increasing from the inlet to the outlet, and a narrow space formed between the dispersion spaces and having a width less than a width of each dispersion spaces.

BRIEF DESCRIPTION OF THE DRAWINGS

The above and other aspects will be more clearly understood from the following description of the exemplary embodiments with reference to the accompanying drawings, in which.

DETAILED DESCRIPTION

Various modifications and various embodiments will be described in detail with reference to the drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well, unless the context clearly indicates otherwise. In the disclosure, the terms such as "comprise", "include", "have/has" should be construed as designating that there are such features, integers, steps, operations, elements, components, and/or combinations thereof, not to exclude the presence or possibility of adding of one or more of other features, integers, steps, operations, elements, components, and/or combinations thereof.

Hereinafter, exemplary embodiments will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, some elements are enlarged, omitted, or depicted schematically.

Figure 1:
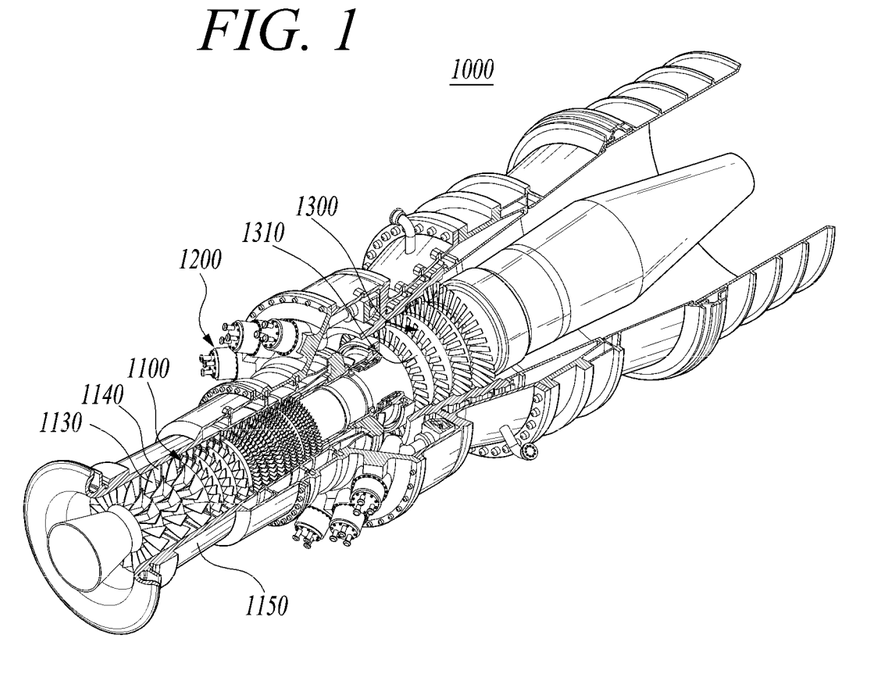
FIG. 1 is a diagram illustrating an internal structure of a gas turbine in accordance with an exemplary embodiment.
Figure 2:
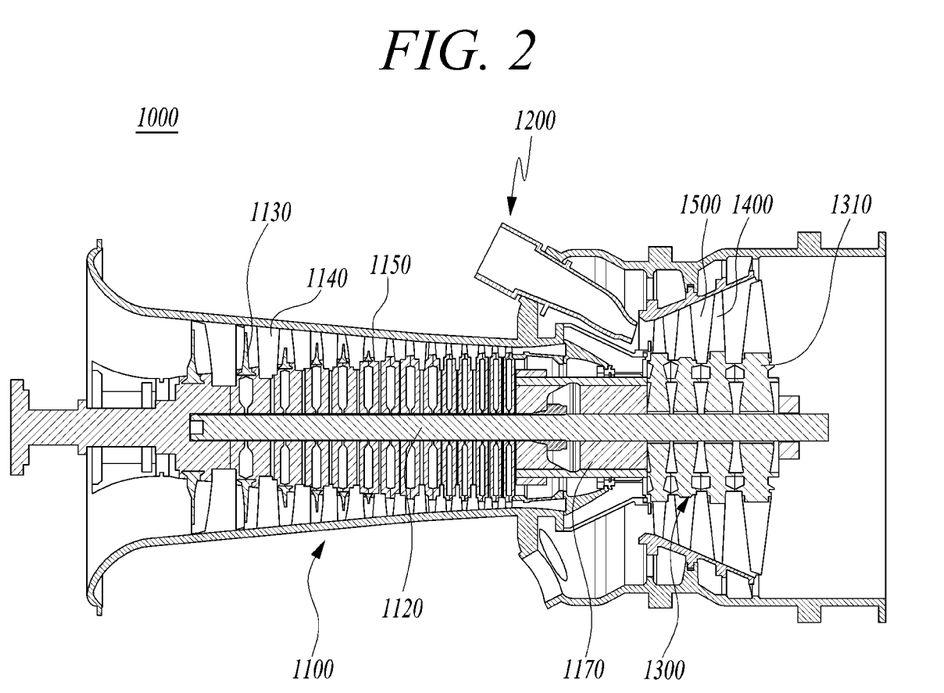
FIG. 2 is a longitudinal sectional view illustrating a portion of the gas turbine of FIG. 1.

FIG. 1 is a diagram illustrating an internal configuration of a gas turbine in accordance with an exemplary embodiment, and FIG. 2 is a longitudinal sectional view of a portion of the gas turbine of FIG. 1.

For example, the thermodynamic cycle of the gas turbine 1000 in accordance with exemplary embodiment may ideally comply with the Brayton cycle. The Brayton cycle may consist of four processes including an isentropic compression (i.e., adiabatic compression) process, an isobaric heat supply process, an isentropic expansion (i.e., adiabatic expansion) process, and an isobaric heat rejection process. In other words, the gas turbine may draw air from the atmosphere, compress the air to a high pressure, combust fuel under isobaric conditions to emit thermal energy, expand the high-temperature combustion gas to convert the thermal energy of the combustion gas into kinetic energy, and discharge exhaust gas with residual energy to the atmosphere. As such, the Brayton cycle may consist of four processes including compression, heat addition, expansion, and heat rejection.

Referring to FIGS. 1 and 2, the gas turbine 1000 embodying the Brayton cycle may include a compressor 1100, a combustor 1200, and a turbine 1300.

The compressor 1100 may draw air from the outside and compress the air. The compressor 1100 may supply air compressed by compressor blades 1130 to the combustor 1200 and also supply compressed air for cooling to a high-temperature region needed to be cooled in the gas turbine 1000. Here, drawn air is compressed in the compressor 1100 through an adiabatic compression process, so that the pressure and the temperature of air passing through the compressor 1100 are increased.

The compressor 1100 is designed in the form of a centrifugal compressor or an axial compressor. The centrifugal compressor is used in a small gas turbine. On the one hand, in a large gas turbine such as the gas turbine 1000 illustrated in FIG. 1, a multi-stage axial compressor 1100 is used to compress a large amount of air. In the multi-stage axial compressor 1100, the compressor blades 1130 rotate along with rotation of a center tie rod 1120 and a rotor disk, compress drawn air, and transfer compressed air to compressor vanes 1140 disposed at a following stage. Air is compressed gradually to high pressures while passing through the compressor blades 1130 formed in a multi-stage structure.

The compressor vanes 1140 may be mounted to an inner surface of the housing 1150 in such a way that a plurality of compressor vanes 1140 form each stage. The compressor vanes 1140 guide compressed air transferred from the compressor blades 1130 disposed at a preceding stage, toward the compressor blades 1130 disposed at the following stage. In an exemplary embodiment, at least some of the plurality of compressor vanes 1140 may be mounted so as to be rotatable within a predetermined range, e.g., to adjust the flow rate of air.

The compressor 1100 may be operated using some of the power output from the turbine 1300. To this end, a rotating shaft of the compressor 1100 may be directly coupled with a rotating shaft of the turbine 1300 by a torque tube 1170. In the case of the large gas turbine 1000, almost half of the output produced by the turbine 1300 may be consumed to drive the compressor 1100.

The combustor 1200 may mix fuel with compressed air supplied from the compressor 1100 and combust the mixture through an isobaric combustion process to generate combustion gas having high energy. The combustor 1200 mixes introduced compressed air with fuel, combusts the fuel mixture to generate high-temperature and high-pressure combustion gas having high energy, and increases, through an isobaric combustion process, the temperature of the combustion gas to a heat resistant limit temperature at which the parts of the combustor and the turbine can endure.

A plurality of combustors constituting the combustor 1200 may be arranged in a housing in a form of a cell. Each of the combustors includes a burner including a fuel injection nozzle, etc., a combustor liner forming a combustion chamber, and a transition piece serving as a connector between the combustor and the turbine.

The high-temperature and high-pressure combustion gas ejected from the combustor 1200 is supplied to the turbine 1300. The supplied high-temperature and high-pressure combustion gas expands and applies impingement or reaction force to the turbine blades 1400 to generate rotational torque. A portion of the rotational torque is transmitted to the compressor 1100 via the torque tube 1170, and the remaining portion which is the excessive torque is used to drive the generator or the like.

The turbine 1300 includes a rotor disk 1310, a plurality of turbine blades 1400 which are radially disposed on the rotor disk 1310, and vanes. The rotor disk 1310 has an approximately disk shape, and a plurality of slots are formed in an outer circumferential surface of the rotor disk 1310. Each slot has a corrugated surface. The turbine blades 1400 are inserted into the respective slots. Each of the turbine blades 1400 may be coupled to the rotor disk 1310 in a dovetail coupling manner. The vanes 1500 fixed to the housing are provided between the turbine blades 1400 to guide a flow direction of combustion gas passing through the turbine blades 1400.

Figure 3:
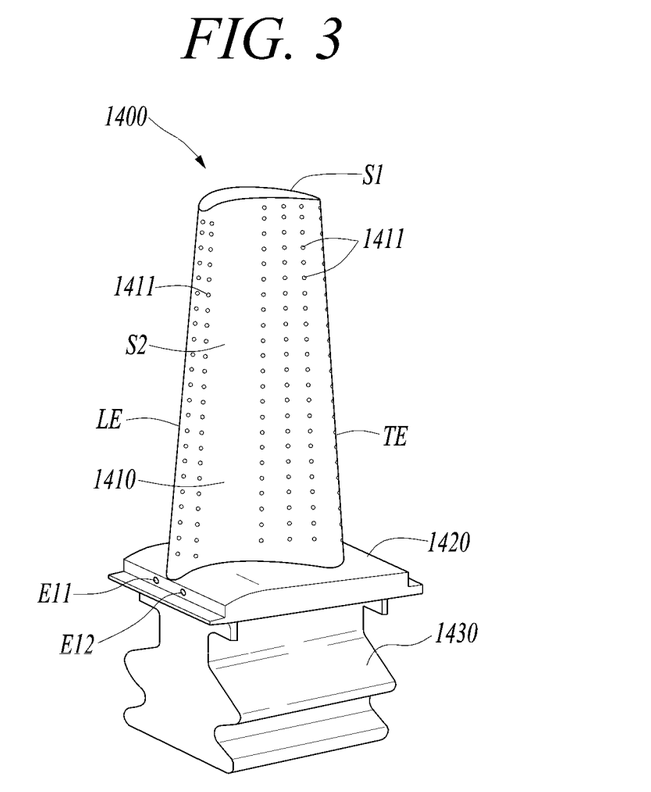
FIG. 3 is a perspective view illustrating a turbine blade in accordance with an exemplary embodiment.
Figure 4:
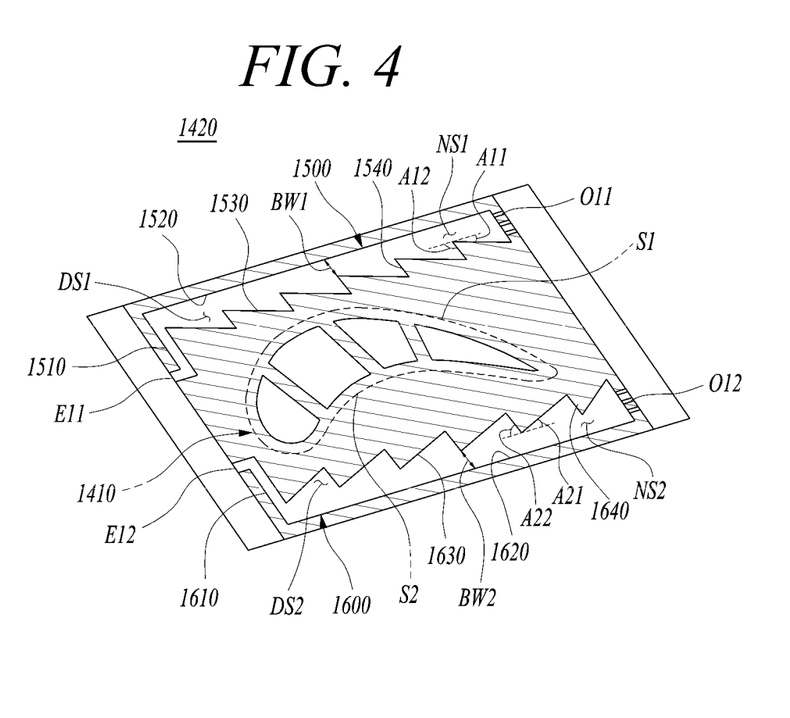
FIG. 4 is a cross-sectional view illustrating a platform in accordance with an exemplary embodiment.

FIG. 3 is a perspective view illustrating a turbine blade in accordance with an exemplary embodiment, and FIG. 4 is a cross-sectional view illustrating a platform in accordance with the exemplary embodiment.

Referring to FIGS. 3 and 4, the turbine blade 1400 includes an airfoil 1410 having a blade shape, a platform 1420 coupled to a lower portion of the airfoil 1410, and a root member 1430 which protrudes downwards from the platform 1420 and is coupled to the rotor disk. The airfoil 1410 may be a curved plate having a blade shape, and have an optimized blade shape according to specifications of the gas turbine 1000.

The airfoil 1410 may include a leading edge LE disposed at an upstream side based on a flow direction of combustion gas, and a trailing edge TE disposed at a downstream side. Furthermore, a suction side S1 protruding outward to have an outward-convex curved surface is formed on a front surface of the airfoil 1410 onto which combustion gas is drawn, and a pressure side S2 having a curved surface depressed in a concaved shape toward the suction side S1 is formed on a rear surface of the airfoil 1410. A difference in pressure occurs between the suction side S1 and the pressure side S2 of the airfoil 1410, whereby the turbine 1300 is rotated.

A plurality of cooling holes 1411 are formed in a surface of the airfoil 1410. The cooling holes 1411 communicates with a cooling passage formed in the airfoil 1410 so that cooling air may be supplied to the surface of the airfoil 1410.

The root member 1430 has a corrugated portion having an approximately fir-tree shape corresponding to the fir-tree-shaped corrugated portion formed in a slot of the rotor disk 1310. It is understood that the coupling structure of the root member 1430 is not limited thereto, and may be formed to have a dovetail structure.

The platform 1420 may be disposed between the airfoil 1410 and the root member 1430 and have an approximately rectangular plate or rectangular pillar shape. The platform 1420 has a side surface which comes into contact with a side surface of the platform 1420 of an adjacent turbine blade 1400 to maintain an interval between the adjacent turbine blades 1400.

The platform 1420 may include inlets E11 and E12, outlets O11 and O12, cooling passages 1500 and 1600, and introduction passages 1510 and 1610. The inlets E11 and E12 may be formed in one side surface of the platform 1420. Each of the cooling passages 1500 and 1600 may be connected with a corresponding one of the inlets E11 and E12. However, it is not limited thereto. The inlets E11 and E12 may be formed in an upper portion or a lower portion of the platform 1420. The outlets O11 and O12 may be formed in a side surface opposite to the side surface in which the inlets E11 and E12 are formed. A plurality of outlets O11 and O12 may be connected to each of the cooling passages 1500 and 1600.

The platform 1420 may include a first cooling passage 1500 and a second cooling passage 1600 which are disposed at positions spaced apart from each other. The first cooling passage 1500 and the second cooling passage 1600 are spaced apart from each other with the airfoil 1410 disposed therebetween. The first cooling passage 1500 faces the suction side S1 of the airfoil 1410. The second cooling passage 1600 faces the pressure side S2 of the airfoil 1410.

The first cooling passage 1500 may connect the inlet E11 and the outlet O11. A plurality of dispersion spaces DS1 and a plurality of narrow spaces NS1 may be formed in the first cooling passage 1500. In each of the dispersion spaces DS1, a width BW1 of the first cooling passage 1500 may be gradually increased. The narrow space NS1 has a width less than that of the dispersion space DS1. The narrow space NS1 may have a width less than that of a portion adjacent thereto. The width of the first cooling passage 1500 on the narrow space NS1 may be smallest.

The first cooling passage 1500 may include a flat surface 1520 extending in a direction from the inlet E11 toward the outlet O11, an inclined guide surface 1530 which faces the flat surface 1520 and is inclined with respect to the flat surface 1520, and a shock surface 1540 which is connected with the inclined guide surface 1530 and extends in a direction from the inclined guide surface 1530 toward the flat surface 1520.

The first cooling passage 1500 may further include an introduction passage 1510 which connects the inlet E11 and the flat surface 1520. The introduction passage 1510 may be connected with the inlet E11 to transfer air into an internal space of the first cooling passage 1500, and formed to extend in a lateral direction. However, the introduction passage 1510 is not an indispensable element. If the inlet E11 and the flat surface 1520 are directly connected to each other, the introduction passage 1510 may be omitted.

The inclined guide surface 1530 is inclined with respect to a direction oriented from the inlet E11 toward the outlet O11 so that the width BW1 of the first cooling passage 1500 on a portion in which the inclined guide surface 1530 is formed is gradually increased in a flow direction. An angle A11 formed between the inclined guide surface 1530 and the flat surface 1520 ranges from 15° to 45°. The inclined guide surface 1530 protrudes in a direction toward the airfoil 1410 and functions to guide the flow of air into the dispersion space DS1.

The shock surface 1540 is formed between inclined guide surfaces 1530 and connected with the inclined guide surfaces 1530. Shock surfaces 1540 and inclined guide surfaces 1530 may be alternately formed. An angle A12 formed between the shock surface 1540 and the flat surface 1520 may be greater than the angle A11 formed between the inclined guide surface 1530 and the flat surface 1520. The angle A12 formed between the shock surface 1540 and the flat surface 1520 ranges from 80° to 110°. Alternatively, the angle A12 ranges from 85° to 90°.

The dispersion space DS1 is formed by the inclined guide surface 1530 and the shock surface 1540. The narrow space NS1 on which the width BW1 of the first cooling passage 1500 is smallest is formed between the shock surface 1540 and the flat surface 1520. Air that moves along the inclined guide surface 1530 is dispersed into the dispersion space DS1 with reduction in speed. Thereafter, the air collides with the shock surface 1540, passes through the narrow space NS1, and then moves into a subsequent dispersion space DS1. Air that moves into the last dispersion space DS1 may be discharged outside the platform 1420 through the outlet O11.

On the one hand, the second cooling passage 1600 may connect the inlet E12 and the outlet O12. A plurality of dispersion spaces DS2 and a plurality of narrow spaces NS2 may be formed in the second cooling passage 1600. In each of the dispersion spaces DS2, a width BW2 of the second cooling passage 1600 may be gradually increased. The narrow space NS2 has a width less than that of the dispersion space DS2. The narrow space NS2 may have a width less than that of a portion adjacent thereto. The width of the second cooling passage 1600 on the narrow space NS2 may be smallest.

The second cooling passage 1600 may include a flat surface 1620 extending in a direction from the inlet E12 toward the outlet O12, an inclined guide surface 1630 which faces the flat surface 1620 and is inclined with respect to the flat surface 1620, and a shock surface 1640 which is connected with the inclined guide surface 1630 and extends in a direction from the inclined guide surface 1630 toward the flat surface 1620.

The second cooling passage 1600 may further include an introduction passage 1610 which connects the inlet E12 and the flat surface 1620. The introduction passage 1610 may be connected with the inlet E12 to transfer air into an internal space of the second cooling passage 1600, and formed to extend in a lateral direction. However, the introduction passage 1610 is not an indispensable element. If the inlet E12 and the flat surface 1620 are directly connected to each other, the introduction passage 1610 may be omitted.

The inclined guide surface 1630 is inclined with respect to a direction oriented from the inlet E12 toward the outlet O12 so that the width BW2 of the second cooling passage 1600 on a portion in which the inclined guide surface 1630 is formed is gradually increased in a flow direction. An angle A21 formed between the inclined guide surface 1630 and the flat surface 1620 ranges from 15° to 45°. The inclined guide surface 1630 protrudes in a direction toward the airfoil 1410 and functions to guide the flow of air into the dispersion space DS2.

The shock surface 1640 is formed between inclined guide surfaces 1630 and connected with the inclined guide surfaces 1630. Shock surfaces 1640 and inclined guide surfaces 1630 may be alternately formed. An angle A22 formed between the shock surface 1640 and the flat surface 1620 may be greater than the angle A21 formed between the inclined guide surface 1630 and the flat surface 1620. The angle A22 formed between the shock surface 1640 and the flat surface 1620 ranges from 80° to 110°. Alternatively the angle A22 ranges from 85° to 90°.

The dispersion space DS2 is formed by the inclined guide surface 1630 and the shock surface 1640. The narrow space NS2 on which the width BW2 of the second cooling passage 1600 is smallest is formed between the shock surface 1640 and the flat surface 1620. Air that moves along the inclined guide surface 1630 is dispersed into the dispersion space DS2 with reduction in speed. Thereafter, the air collides with the shock surface 1640, passes through the narrow space NS2, and then moves into a subsequent dispersion space DS2. Air that moves into the last dispersion space DS2 may be discharged outside the platform 1420 through the outlet O12.

As illustrated in FIG. 4, if the dispersion spaces DS1 and DS2 and the narrow spaces NS1 and NS2 are formed by the inclined guide surfaces 1530 and 1630 and the shock surfaces 1540 and 1640, dispersion and collision of air are repeatedly performed while the air flows. Therefore, a contact area between the platform 1420 and air may be increased, and a contact time therebetween may be increased, whereby the cooling efficiency may be enhanced. Also, because increased-width portions and reduced-width portions are alternately formed, a mechanical strength of the platform 1420 may be enhanced, so that the platform 1420 may reliably support a dynamic load.

Figure 5:
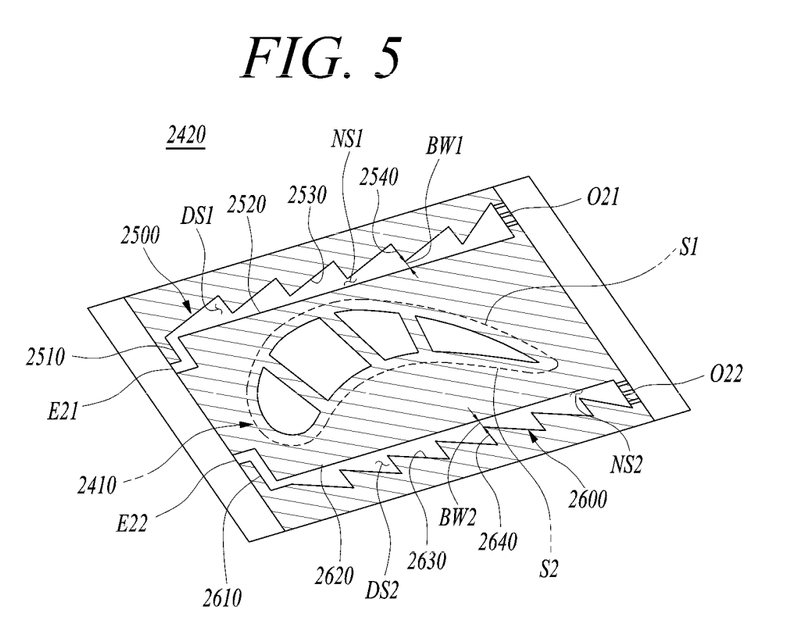
FIG. 5 is a cross-sectional view illustrating a platform in accordance with another exemplary embodiment.

FIG. 5 is a cross-sectional view illustrating a platform in accordance with an exemplary embodiment.

Referring to FIG. 5, the structure of the turbine blade in accordance with the exemplary embodiment except the platform has the same structure as that of the turbine blade illustrated in FIG. 4, therefore, repetitive explanation thereof will be omitted.

The platform 2420 may include inlets E21 and E22, outlets O21 and O22, cooling passages 2500 and 2600, and introduction passages 2510 and 2610. The inlets E21 and E22 may be formed in one side surface of the platform 2420. Each of the cooling passages 2500 and 2600 may be connected with a corresponding one of the inlets E21 and E22. The outlets O21 and O22 may be formed in a side surface opposite to the side surface in which the inlets E21 and E22 are formed. A plurality of outlets O21 and O22 may be connected to each of the cooling passages 2500 and 2600.

The platform 2420 may include a first cooling passage 2500 and a second cooling passage 2600 which are disposed at positions spaced apart from each other. The first cooling passage 2500 and the second cooling passage 2600 are spaced apart from each other with the airfoil 2410 disposed therebetween. The first cooling passage 2500 faces the suction side S1 of the airfoil 2410. The second cooling passage 2600 faces the pressure side S2 of the airfoil 2410.

The first cooling passage 2500 may connect the inlet E21 and the outlet O21. A plurality of dispersion spaces DS1 and a plurality of narrow spaces NS1 may be formed in the first cooling passage 2500. In each of the dispersion spaces DS1, a width BW1 of the first cooling passage 2500 may be gradually increased. The narrow space NS1 has a width BW1 less than that of the dispersion space DS1.

The first cooling passage 2500 may include a flat surface 2520 extending in a direction from the inlet E21 toward the outlet O21, an inclined guide surface 2530 which faces the flat surface 2520 and is inclined with respect to the flat surface 2520, and a shock surface 2540 which is connected with the inclined guide surface 2530 and extends in a direction from the inclined guide surface 2530 toward the flat surface 2520.

The first cooling passage 2500 may further include an introduction passage 2510 which connects the inlet E21 and the flat surface 2520. The introduction passage 2510 may be connected with the inlet E21 to transfer air into an internal space of the first cooling passage 2500, and formed to extend in a lateral direction.

The inclined guide surface 2530 is inclined with respect to a direction oriented from the inlet E21 toward the outlet O21 so that the width BW1 of the first cooling passage 2500 on a portion in which the inclined guide surface 2530 is formed is gradually increased in a flow direction. The inclined guide surface 2530 protrudes in a direction toward a side end of the platform 2420 and functions to guide the flow of air into the dispersion space DS1.

The shock surface 2540 is formed between inclined guide surfaces 2530 and connected with the inclined guide surfaces 2530. Shock surfaces 2540 and inclined guide surfaces 2530 may be alternately formed. The dispersion space DS1 is formed by the inclined guide surface 2530 and the shock surface 2540. The narrow space NS1 on which the width BW1 of the first cooling passage 2500 is smallest is formed between the shock surface 2540 and the flat surface 2520. Air that moves along the inclined guide surface 2530 is dispersed into the dispersion space DS1 with reduction in speed. Thereafter, the air collides with the shock surface 2540, passes through the narrow space NS1, and then moves into a subsequent dispersion space DS1. Air that moves into the last dispersion space DS1 may be discharged outside the platform 2420 through the outlet O21.

On the one hand, the second cooling passage 2600 may connect the inlet E22 and the outlet O22. A plurality of dispersion spaces DS2 and a plurality of narrow spaces NS2 may be formed in the second cooling passage 2600. In each of the dispersion spaces DS2, a width BW2 of the second cooling passage 2600 may be gradually increased. The narrow space NS2 has a width less than that of the dispersion space DS2.

The second cooling passage 2600 may include a flat surface 2620 extending in a direction from the inlet E22 toward the outlet O22, an inclined guide surface 2630 which faces the flat surface 2620 and is inclined with respect to the flat surface 2620, and a shock surface 2640 which is connected with the inclined guide surface 2630 and extends in a direction from the inclined guide surface 2630 toward the flat surface 2620.

The second cooling passage 2600 may further include an introduction passage 2610 which connects the inlet E22 and the flat surface 2620. The introduction passage 2610 is connected with the inlet E22 and functions to transfer air into an internal space of the second cooling passage 2600.

The inclined guide surface 2630 is inclined with respect to a direction oriented from the inlet E22 toward the outlet O22 so that the width BW2 of the second cooling passage 2600 on a portion in which the inclined guide surface 2630 is formed is gradually increased in a flow direction. The inclined guide surface 2630 protrudes in a direction toward a side end of the platform 2420 and functions to guide the flow of air into the dispersion space DS2.

The shock surface 2640 is formed between inclined guide surfaces 2630 and connected with the inclined guide surfaces 2630. Shock surfaces 2640 and inclined guide surfaces 2630 may be alternately formed. The dispersion space DS2 is formed by the inclined guide surface 2630 and the shock surface 2640. The narrow space NS2 on which the width BW2 of the second cooling passage 2600 is smallest is formed between the shock surface 2640 and the flat surface 2620. Air that moves along the inclined guide surface 2630 is dispersed into the dispersion space DS2 with reduction in speed. Thereafter, the air collides with the shock surface 2640, passes through the narrow space NS2, and then moves into a subsequent dispersion space DS2. Air that moves into the last dispersion space DS2 may be discharged outside the platform 2420 through the outlet O22.

As illustrated in FIG. 5, if the dispersion spaces DS1 and DS2 and the narrow spaces NS1 and NS2 are formed by the inclined guide surfaces 2530 and 2630 and the shock surfaces 2540 and 2640, dispersion and collision of air are repeatedly performed while the air flows. Therefore, a contact area between the platform 2420 and air may be increased, and a contact time therebetween may be increased, whereby the cooling efficiency may be enhanced.

Figure 6:
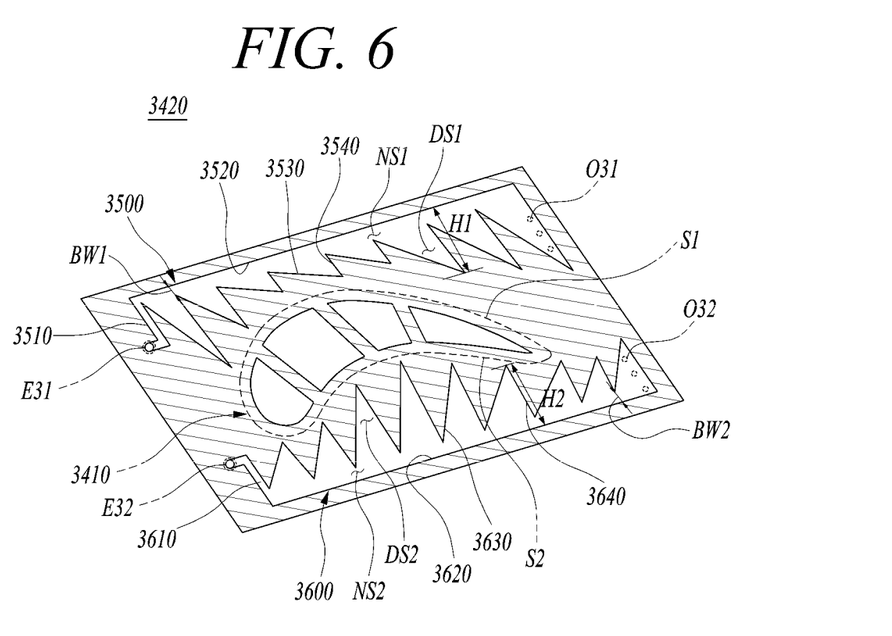
FIG. 6 is a cross-sectional view illustrating a platform in accordance with another exemplary embodiment.

FIG. 6 is a cross-sectional view illustrating a platform in accordance with an exemplary embodiment.

Referring to FIG. 6, the structure of the turbine blade in accordance with the exemplary embodiment except the platform has the same structure as that of the turbine blade illustrated in FIG. 4, therefore, repetitive explanation thereof will be omitted.

The platform 3420 may include inlets E31 and E32, outlets O31 and O32, cooling passages 3500 and 3600, and introduction passages 3510 and 3610. The inlets E31 and E32 and the outlet O31 and O32 are formed in a top surface of the platform 3420. However, it is not limited thereto. The inlets E31 and E32 and the outlets O31 and O32 may be formed in a bottom surface of the platform 3420.

The platform 3420 may include a first cooling passage 3500 and a second cooling passage 3600 which are disposed at positions spaced apart from each other. The first cooling passage 3500 and the second cooling passage 3600 are spaced apart from each other with the airfoil 3410 disposed therebetween. The first cooling passage 3500 faces the suction side S1 of the airfoil 3410. The second cooling passage 3600 faces the pressure side S2 of the airfoil 3410.

The first cooling passage 3500 may connect the inlet E31 and the outlet O31. A plurality of dispersion spaces DS1 and a plurality of narrow spaces NS1 may be formed in the first cooling passage 3500. In each of the dispersion spaces DS1, a width BW1 of the first cooling passage 3500 may be gradually increased. The narrow space NS1 has a width BW1 less than that of the dispersion space DS1.

The first cooling passage 3500 may include a flat surface 3520 extending in a direction from the inlet E31 toward the outlet O31, an inclined guide surface 3530 which faces the flat surface 3520 and is inclined with respect to the flat surface 3520, and a shock surface 3540 which is connected with the inclined guide surface 3530 and extends in a direction from the inclined guide surface 3530 toward the flat surface 3520.

The first cooling passage 3500 may further include an introduction passage 3510 which connects the inlet E31 and the flat surface 3520. The introduction passage 3510 may be connected with the inlet E31 to transfer air into an internal space of the first cooling passage 3500, and formed to extend in a lateral direction.

The inclined guide surface 3530 is inclined with respect to a direction oriented from the inlet E31 toward the outlet O31 so that the width BW1 of the first cooling passage 3500 on a portion in which the inclined guide surface 3530 is formed is gradually increased in a flow direction. The inclined guide surface 3530 protrudes in a direction toward the airfoil 3410 and functions to guide the flow of air into the dispersion space DS1.

In the first cooling passage 3500, a height H1 of an inclined guide surface 3530 that is formed in a central portion may be less than a height H1 of an inclined guide surface 3530 that is formed at an outer side. The height H1 of the inclined guide surface 3530 that is formed in the central portion may be 0.5 times to 0.9 times of the height H1 of the inclined guide surface 3530 that is formed at the outer side. Furthermore, the height H1 of the inclined guide surface 3530 may be gradually reduced from the outer side to the inner side.

The shock surface 3540 is formed between inclined guide surfaces 3530 and connected with the inclined guide surfaces 3530. Shock surfaces 3540 and inclined guide surfaces 3530 may be alternately formed. The dispersion space DS1 is formed by the inclined guide surface 3530 and the shock surface 3540. The narrow space NS1 on which the width BW1 of the first cooling passage 3500 is smallest is formed between the shock surface 3540 and the flat surface 3520. Air that moves along the inclined guide surface 3530 is dispersed into the dispersion space DS1 with reduction in speed. Thereafter, the air collides with the shock surface 3540, passes through the narrow space NS1, and then moves into a subsequent dispersion space DS1. Air that moves into the last dispersion space DS1 may be discharged outside the platform 3420 through the outlet O31.

On the one hand, the second cooling passage 3600 may connect the inlet E32 and the outlet O32. A plurality of dispersion spaces DS2 and a plurality of narrow spaces NS2 may be formed in the second cooling passage 3600. In each of the dispersion spaces DS2, a width BW2 of the second cooling passage 3600 may be gradually increased. The narrow space NS2 has a width less than that of the dispersion space DS2.

The second cooling passage 3600 may include a flat surface 3620 extending in a direction from the inlet E32 toward the outlet O32, an inclined guide surface 3630 which faces the flat surface 3620 and is inclined with respect to the flat surface 3620, and a shock surface 3640 which is connected with the inclined guide surface 3630 and extends in a direction from the inclined guide surface 3630 toward the flat surface 3620.

The second cooling passage 3600 may further include an introduction passage 3610 which connects the inlet E32 and the flat surface 3620. The introduction passage 3610 is connected with the inlet E32 and functions to transfer air into an internal space of the second cooling passage 3600.

The inclined guide surface 3630 is inclined with respect to a direction oriented from the inlet E32 toward the outlet O32 so that the width BW2 of the second cooling passage 3600 on a portion in which the inclined guide surface 3630 is formed is gradually increased in a flow direction.

The inclined guide surface 3630 protrudes in a direction toward the airfoil 3410 and functions to guide the flow of air into the dispersion space DS2. In the second cooling passage 3600, a height H2 of an inclined guide surface 3630 that is formed in a central portion may be greater than a height H2 of an inclined guide surface 3630 that is formed at an outer side. The height H2 of the inclined guide surface 3630 that is formed in the central portion may be 1.1 times to 1.5 times of the height H2 of the inclined guide surface 3630 that is formed at the outer side. Furthermore, the height H2 of the inclined guide surface 3630 may be gradually increased from the outer side to the inner side.

The shock surface 3640 is formed between inclined guide surfaces 3630 and connected with the inclined guide surfaces 3630. Shock surfaces 3640 and inclined guide surfaces 3630 may be alternately formed. The dispersion space DS2 is formed by the inclined guide surface 3630 and the shock surface 3640. The narrow space NS2 on which the width BW2 of the second cooling passage 3600 is smallest is formed between the shock surface 3640 and the flat surface 3620. Air that moves along the inclined guide surface 3630 is dispersed into the dispersion space DS2 with reduction in speed. Thereafter, the air collides with the shock surface 3640, passes through the narrow space NS2, and then moves into a subsequent dispersion space DS2. Air that moves into the last dispersion space DS2 may be discharged outside the platform 3420 through the outlet O32.

As illustrated in FIG. 6, if the dispersion spaces DS1 and DS2 and the narrow spaces NS1 and NS2 are formed by the inclined guide surfaces 3530 and 3630 and the shock surfaces 3540 and 3640, dispersion and collision of air are repeatedly performed while the air flows. Therefore, a contact area between the platform 3420 and air may be increased, and a contact time therebetween may be increased, whereby the cooling efficiency may be enhanced.

Furthermore, in the first cooling passage 3500, the height H1 of the inclined guide surface 3530 that is formed in the central portion is less than the height H1 of the inclined guide surface 3530 that is formed at the outer side. In the second cooling passage 3600, the height H2 of the inclined guide surface 3630 that is formed in the central portion is greater than the height H2 of the inclined guide surface 3630 that is formed at the outer side. In this case, the internal portion of the platform 3420 may be uniformly cooled.

Figure 7:
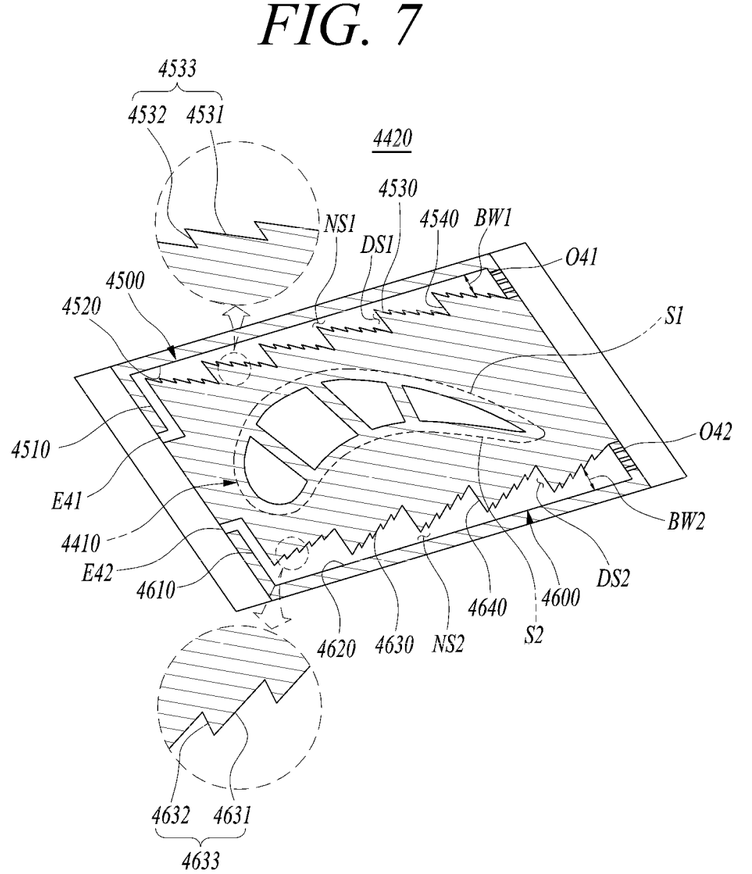
FIG. 7 is a cross-sectional view illustrating a platform in accordance with another exemplary embodiment.

FIG. 7 is a cross-sectional view illustrating a platform in accordance with an exemplary embodiment.

Referring to FIG. 7, the structure of the turbine blade in accordance with the exemplary embodiment except the platform has the same structure as that of the turbine blade illustrated in FIG. 4, therefore, repetitive explanation thereof will be omitted.

The platform 4420 may include inlets E41 and E42, outlets O41 and O42, cooling passages 4500 and 4600, and introduction passages 4510 and 4610. The inlets E41 and E42 may be formed in one side surface of the platform 4420. The outlets O41 and O42 may be formed in a side surface opposite to the side surface in which the inlets E41 and E42 are formed.

The platform 4420 may include a first cooling passage 4500 and a second cooling passage 4600 which are disposed at positions spaced apart from each other. The first cooling passage 4500 and the second cooling passage 4600 are spaced apart from each other with the airfoil 4410 disposed therebetween. The first cooling passage 4500 faces the suction side S1 of the airfoil 4410. The second cooling passage 4600 faces the pressure side S2 of the airfoil 4410.

The first cooling passage 4500 may connect the inlet E41 and the outlet O41. A plurality of dispersion spaces DS1 and a plurality of narrow spaces NS1 may be formed in the first cooling passage 4500. In each of the dispersion spaces DS1, a width BW1 of the first cooling passage 4500 may be gradually increased. The narrow space NS1 has a width BW1 less than that of the dispersion space DS1.

The first cooling passage 4500 may include a flat surface 4520 extending in a direction from the inlet E41 toward the outlet O41, an inclined guide surface 4530 which faces the flat surface 4520 and is inclined with respect to the flat surface 4520, and a shock surface 4540 which is connected with the inclined guide surface 4530 and extends in a direction from the inclined guide surface 4530 toward the flat surface 4520.

The first cooling passage 4500 may further include an introduction passage 4510 which connects the inlet E41 and the flat surface 4520. The introduction passage 4510 may be connected with the inlet E41 to transfer air into an internal space of the first cooling passage 4500, and formed to extend in a lateral direction.

The inclined guide surface 4530 is inclined with respect to a direction oriented from the inlet E41 toward the outlet O41 so that the width BW1 of the first cooling passage 4500 on a portion in which the inclined guide surface 4530 is formed is gradually increased in a flow direction. The inclined guide surface 4530 protrudes in a direction toward the airfoil 4410 and functions to guide the flow of air into the dispersion space DS1.

A plurality of shock protrusions 4533 may be formed on the inclined guide surface 4530. Each of the shock protrusions 4533 may include a fine inclined surface 4531 formed to be inclined with respect to the flat surface 4520, and a fine collision surface 4532 formed in parallel to the shock surface 4540. The fine inclined surface 4531 may be inclined at 30° with respect to the flat surface 4520. The fine collision surface 4532 may extend in a direction perpendicular to the flat surface 4520. As such, if the shock protrusions 4533 are formed on the inclined guide surface 4530, a contact area between air and the platform 4420 may be increased, and the shock protrusions 4533 can induce turbulence in the flow of air so that a residence time of air may be increased, whereby the cooling efficiency may be further enhanced.

The shock surface 4540 is formed between inclined guide surfaces 4530 and connected with the inclined guide surfaces 4530. Shock surfaces 4540 and inclined guide surfaces 4530 may be alternately formed. The dispersion space DS1 is formed by the inclined guide surface 4530 and the shock surface 4540. The narrow space NS1 on which the width BW1 of the first cooling passage 4500 is smallest is formed between the shock surface 4540 and the flat surface 4520. Air that moves along the inclined guide surface 4530 is dispersed into the dispersion space DS1 with reduction in speed. Thereafter, the air collides with the shock surface 4540, passes through the narrow space NS1, and then moves into a subsequent dispersion space DS1. Air that moves into the last dispersion space DS1 may be discharged outside the platform 4420 through the outlet O41.

On the one hand, the second cooling passage 4600 may connect the inlet E42 and the outlet O42. A plurality of dispersion spaces DS2 and a plurality of narrow spaces NS2 may be formed in the second cooling passage 4600. In each of the dispersion spaces DS2, a width BW2 of the second cooling passage 4600 may be gradually increased. The narrow space NS2 has a width less than that of the dispersion space DS2.

The second cooling passage 4600 may include a flat surface 4620 extending in a direction from the inlet E42 toward the outlet O42, an inclined guide surface 4630 which faces the flat surface 4620 and is inclined with respect to the flat surface 4620, and a shock surface 4640 which is connected with the inclined guide surface 4630 and extends in a direction from the inclined guide surface 4630 toward the flat surface 4620.

The second cooling passage 4600 may further include an introduction passage 4610 which connects the inlet E42 and the flat surface 4620. The introduction passage 4610 is connected with the inlet E42 and functions to transfer air into an internal space of the second cooling passage 4600.

The inclined guide surface 4630 is inclined with respect to a direction oriented from the inlet E42 toward the outlet O42 so that the width BW2 of the second cooling passage 4600 on a portion in which the inclined guide surface 4630 is formed is gradually increased in a flow direction. The inclined guide surface 4630 protrudes in a direction toward the airfoil 4410 and functions to guide the flow of air into the dispersion space DS2.

A plurality of shock protrusions 4633 may be formed on the inclined guide surface 4630. Each of the shock protrusions 4633 may include a fine inclined surface 4631 formed to be inclined with respect to the flat surface 4620, and a fine collision surface 4632 formed in parallel to the shock surface 4640. The fine inclined surface 4631 may be inclined at 30° with respect to the flat surface 4620. The fine collision surface 4632 may extend in a direction perpendicular to the flat surface 4620. As such, if the shock protrusions 4633 are formed on the inclined guide surface 4630, a contact area between air and the platform 4420 may be increased, and the shock protrusions 4633 can induce turbulence in the flow of air so that the residence time of air may be increased, whereby the cooling efficiency may be further enhanced.

The shock surface 4640 is formed between inclined guide surfaces 4630 and connected with the inclined guide surfaces 4630. Shock surfaces 4640 and inclined guide surfaces 4630 may be alternately formed. The dispersion space DS2 is formed by the inclined guide surface 4630 and the shock surface 4640. The narrow space NS2 on which the width BW2 of the second cooling passage 4600 is smallest is formed between the shock surface 4640 and the flat surface 4620. Air that moves along the inclined guide surface 4630 is dispersed into the dispersion space DS2 with reduction in speed. Thereafter, the air collides with the shock surface 4640, passes through the narrow space NS2, and then moves into a subsequent dispersion space DS2. Air that moves into the last dispersion space DS2 may be discharged outside the platform 4420 through the outlet O42.

As illustrated in FIG. 7, if the dispersion spaces DS1 and DS2 and the narrow spaces NS1 and NS2 are formed by the inclined guide surfaces 4530 and 4630 and the shock surfaces 4540 and 4640, dispersion and collision of air are repeatedly performed while the air flows. Therefore, a contact area between the platform 4420 and air may be increased, and a contact time therebetween may be increased, whereby the cooling efficiency may be enhanced.

Furthermore, the shock protrusions 4533 and 4633 are formed on the inclined guide surfaces 4530 and 4630, so that a contact area between air and the platform 4420 may be increased, and the shock protrusions 4533 and 4633 can induce turbulence in the flow of air so that a residence time of air may be increased, whereby the cooling efficiency may be further enhanced.

In a turbine blade and a turbine in accordance with an exemplary embodiment, a dispersion space and a narrow space are formed in a cooling passage formed in a platform so that the flow of air may be delayed and a contact area between air and platform may be increased, whereby the cooling efficiency may be enhanced.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A turbine blade comprising:
an airfoil having a blade shape and including a suction side formed in a convex shape and a pressure side formed in a concave shape;
a platform coupled to a lower portion of the airfoil; and
a root member protruding downward from the platform and coupled to a rotor disk,
wherein the platform comprises:
a plurality of inlets through which air is drawn into the platform;
a plurality of outlets through which the air is discharged from the platform; and
a cooling passage connecting the inlets to the outlets and including a plurality of dispersion spaces, a width in each dispersion spaces increasing from the inlet to the outlet, and a narrow space formed between the dispersion spaces and having a width less than the width of each dispersion spaces.

2. The turbine blade according to claim 1, wherein the cooling passage comprises a flat surface extending in a direction oriented from the inlet toward the outlet, an inclined guide surface formed to face the flat surface and extending to be inclined with respect to the flat surface, and a shock surface coupled with the inclined guide surface and extending in a direction oriented from the inclined guide surface toward the flat surface.

3. The turbine blade according to claim 2, wherein the inclined guide surface and the shock surface are alternately formed.

4. The turbine blade according to claim 3, wherein the dispersion space is formed by the inclined guide surface and the shock surface, and the narrow space is formed between the shock surface and the flat surface.

5. The turbine blade according to claim 4, wherein the inclined guide surface protrudes in a direction toward the airfoil.

6. The turbine blade according to claim 4, wherein the inclined guide surface protrudes in a direction toward a side end of the platform.

7. The turbine blade according to claim 4, wherein an angle formed between the shock surface and the flat surface is greater than an angle formed between the inclined guide surface and the flat surface.

8. The turbine blade according to claim 1,
wherein the cooling passage comprises a first cooling passage formed to face the suction side of the airfoil, and a second cooling passage formed to face the pressure side of the airfoil, and
wherein each of the first cooling passage and the second cooling passage comprises a flat surface extending in a direction oriented from the inlet toward the outlet, an inclined guide surface formed to face the flat surface and inclined with respect to the flat surface, and a shock surface extending in a direction oriented from the inclined guide surface toward the flat surface.

9. The turbine blade according to claim 8, wherein, in the first cooling passage, a height of the inclined guide surface that is formed in a central portion is less than a height of the inclined guide surface that is formed at an outer side.

10. The turbine blade according to claim 9, wherein, in the second cooling passage, a height of the inclined guide surface that is formed in a central portion is greater than a height of the inclined guide surface that is formed at an outer side.

11. The turbine blade according to claim 8, wherein a plurality of shock protrusions are formed on the inclined guide surface, and each of the shock protrusions comprises a fine inclined surface formed to be inclined with respect to the flat surface-nd a fine collision surface formed in parallel to the shock surface.

12. A turbine comprising:
a rotor disk configured to be rotatable; and
a plurality of turbine blades installed on the rotor disk,
wherein each of the turbine blade comprises an airfoil having a blade shape and including a suction side formed in a convex shape and a pressure side formed in a concave shape, a platform coupled to a lower portion of the airfoil, and a root member protruding downward from the platform and coupled to the rotor disk, and
wherein the platform comprises:
a plurality of inlets through which air is drawn into the platform;
a plurality of outlets through which the air is discharged from the platform; and
a cooling passage connecting the inlets to the outlets and including a plurality of dispersion spaces, a width in each dispersion spaces increasing from the inlet to the outlet, and a narrow space formed between the dispersion spaces and having a width less than a width of each dispersion spaces.

13. The turbine according to claim 12, wherein the cooling passage comprises a flat surface extending in a direction oriented from the inlet toward the outlet, an inclined guide surface formed to face the flat surface and extending to be inclined with respect to the flat surface, and a shock surface coupled with the inclined guide surface and extending in a direction oriented from the inclined guide surface toward the flat surface.

14. The turbine according to claim 13, wherein the inclined guide surface and the shock surface are alternately formed.

15. The turbine according to claim 14, wherein the dispersion space is formed by the inclined guide surface and the shock surface, and the narrow space is formed between the shock surface and the flat surface.

16. The turbine according to claim 15, wherein the inclined guide surface protrudes in a direction toward the airfoil.

17. The turbine according to claim 15, wherein the inclined guide surface protrudes in a direction toward a side end of the platform.

18. The turbine according to claim 15, wherein an angle formed between the shock surface and the flat surface is greater than an angle formed between the inclined guide surface and the flat surface.

19. The turbine according to claim 12,
wherein the cooling passage comprises a first cooling passage formed to face the suction side of the airfoil, and a second cooling passage formed to face the pressure side of the airfoil, and
wherein each of the first cooling passage and the second cooling passage comprises a flat surface extending in a direction oriented from the inlet toward the outlet, an inclined guide surface formed to face the flat surface and inclined with respect to the flat surface, and a shock surface extending in a direction oriented from the inclined guide surface toward the flat surface.

20. A gas turbine comprising:
a compressor configured to compress air drawn thereinto from an outside;
a combustor configured to mix fuel with air compressed by the compressor and combust a mixture of the fuel and the compressed air; and
a turbine including a plurality of turbine blades configured to be rotated by combustion gas discharged from the combustor,
wherein each of the turbine blade comprises an airfoil having a blade shape and including a suction side formed in a convex shape and a pressure side formed in a concave shape, a platform coupled to a lower portion of the airfoil, and a root member protruding downward from the platform and coupled to the rotor disk, and
wherein the platform comprises:
a plurality of inlets through which air is drawn into the platform;
a plurality of outlets through which the air is discharged from the platform; and
a cooling passage connecting the inlets to the outlets and including a plurality of dispersion spaces, a width in each dispersion spaces increasing from the inlet to the outlet, and a narrow space formed between the dispersion spaces and having a width less than a width of each dispersion spaces.

* * * * *